W. J. DAVIDSON.
Shovel-Plow.
No. 220,352.  Patented Oct. 7, 1879.
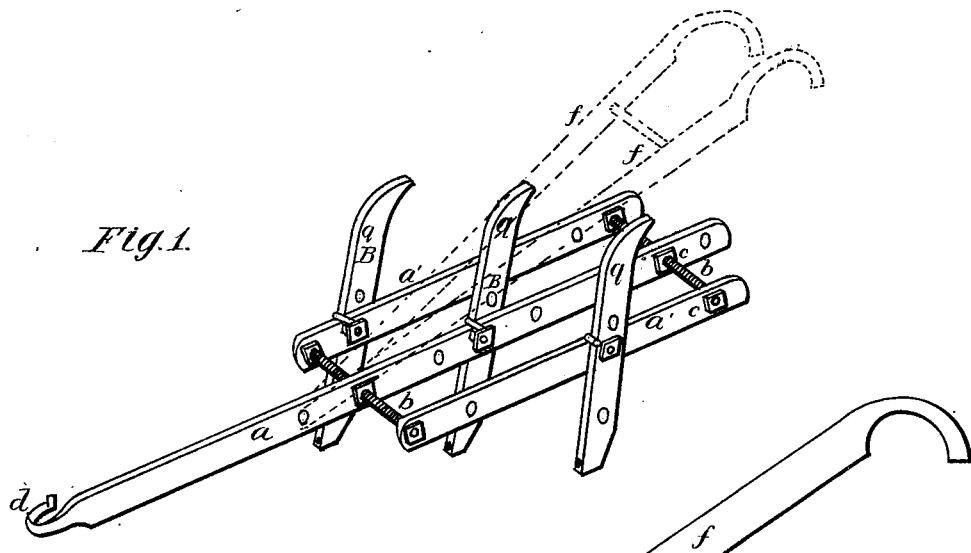
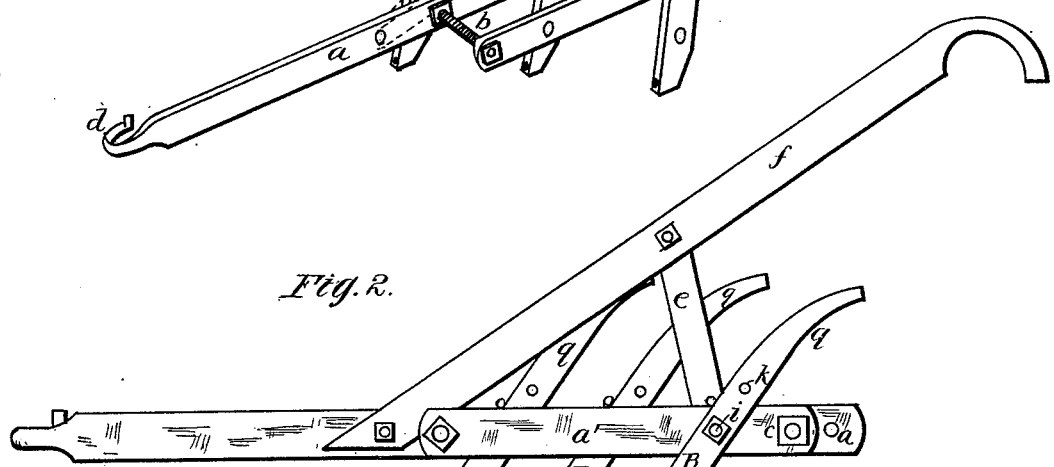
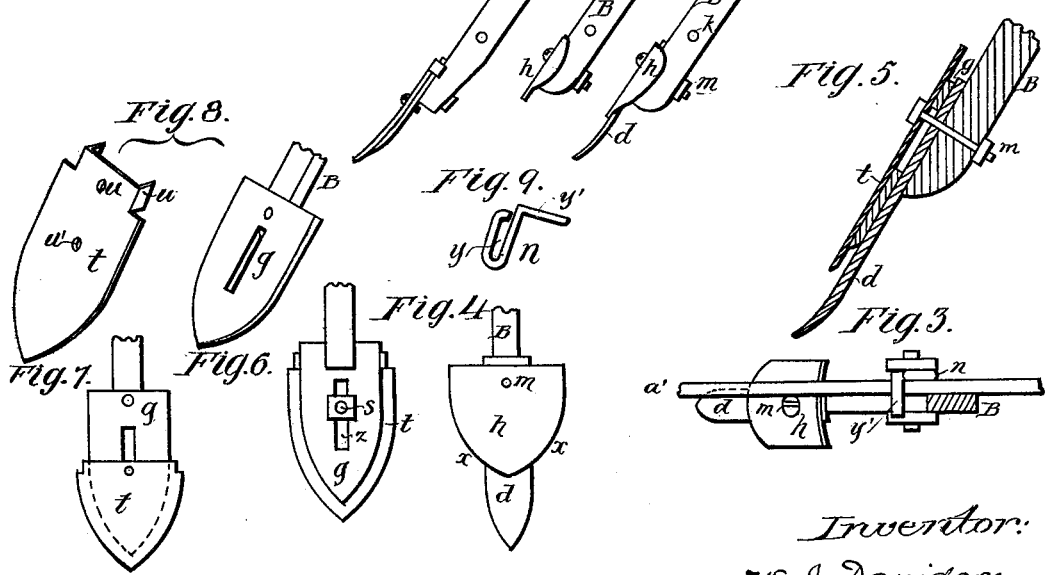
Attest:
Courtney A. Cooper.
William Paxton.
Inventor:
W. J. Davidson
By his attorney
Charles E. Foster.

UNITED STATES PATENT OFFICE.

WILLIAM J. DAVIDSON, OF BIG SPRING, VIRGINIA.

IMPROVEMENT IN SHOVEL-PLOWS.

Specification forming part of Letters Patent No. 220,352, dated October 7, 1879; application filed February 14, 1879.

*To all whom it may concern:*

Be it known that I, WILLIAM J. DAVIDSON, of Big Spring, Montgomery county, Virginia, have invented Improvements in Shovel-Plows, of which the following is a specification.

My invention is a shovel-plow constructed as fully described hereinafter, to permit the use of one or more of the plows, facilitate their adjustment, impart greater durability thereto, and reduce the expense of construction and use.

In the drawings forming part of this specification, Figure 1 is a perspective view, showing the plow-frame; Fig. 2, a side elevation of the plow; Fig. 3, a partial plan; Fig. 4, a detached view, showing the construction and arrangement of the blades; Fig. 5, a section of the blades and part of the standard, enlarged; Fig. 6, a rear view of the plow-blade and its shoe; Fig. 7, a face view, showing the parts in a different position; Fig. 8, a view showing the shoe and face-plate detached; Fig. 9, a detached view of the gage for adjusting the standards.

The frame of the implement consists of a central flat bar, $a$, and two shorter parallel bars, $a'$ $a'$, secured parallel to the central bar, near its rear end, by cross screw-bolts $b$ and nuts $c$, which clamp the bars on each side, as shown. The front end of the bar $a$ is formed into a hook, $d$, and the handles $f f$ are both bolted to the central bar, and strengthened by braces $e$, clamped to the same bar. The bars are perforated to receive bolts $i$, by which standards B are clamped thereto in any desired position and at any required angle, the latter being maintained by gages $n$, each consisting of a wire bent to form a loop, $y$, and finger $y'$, the loop being clamped between the nut and the beam or bar, and the finger extending across the bar above or below, in front or rear, and acting as a stop, against which the standard may be maintained in any desired position.

Any required number of standards may be secured to the frame thus constructed.

Thus each bar $a'$ $a'$ may support a separate standard, and they may be arranged on the same transverse line, or two on the same line, and one before and behind, or all on a diagonal line, as shown.

The lateral position of the standards and plow carried thereby may also be adjusted to any required extent by manipulating the nuts $c$ of the screw-bolts $b$, so that the bars $a'$ $a'$ may be placed and secured at any desired distance from the central bar; or the side bars and bolts may be entirely detached, leaving the single central bar, its standard, plow, and handles for use as an ordinary shovel-plow.

In order to penetrate deeply, yet open a wide channel, without the use of the ordinary wide and long heart-shaped blades, I combine with the usual "bull-tongue" $d$, Figs. 3 and 4, a short pointed blade, $h$, constituting a half-shovel, having an opening near the upper edge, so that it may be secured to the standard by the same bolt, $m$, that secures the bull-tongue.

When thus arranged, as shown, the tongue penetrates deeply into the earth, while the inclined edges $x$ $x$ of the blade $g$ penetrate, but to a less extent, and cut a shallow channel, and turn out the earth like the ordinary plow.

The advantage over the usual plow is a deeper cut with a blade of much less weight than ordinarily required for heavy work, as the tongue $d$ braces and strengthens the blade $h$. As the bolt $m$ secures both blades, so it will secure each separately; and the construction of the point of the blade $h$ is such that when used alone it will penetrate and open the earth in the same manner as an ordinary cultivator-blade.

The blades $h$ may be of cast-iron or steel, but as thus formed are expensive, lose their shape by wear, require frequent sharpening, and must be thrown aside while much of the metal remains unused.

I prefer to use a combined blade, consisting of a shoe, $g$, of cast-iron, of the proper form, secured to the standard, and slotted to receive a bolt, $s$, and a plate, $t$, of very thin steel of the same outline as the shoe, but slightly larger, so as to project at each edge, as shown, and secured by the bolt $s$, which passes through one of two holes, $u$ $u'$. The blade is bent at the top to form two ears, $w$, which clamp the shoe and prevent the blade from turning. The blade is always sharp, being so extremely thin, and presents that clean polished surface so desirable, and, as it wears away, can be adjusted by means of the screw-bolt $s$, and thus gradually moved down until the opening $u$ is at the end of the slot $z$ in the shoe, when the bolt may be transferred to the opening $u'$, and the plate again fed down until it is nearly worn away, Fig. 7.

As the shoe $g$ is never worn, it can be used for an indefinite length of time. It supports plates $t$, so thin that they can be made and replaced at a slight cost, and never require sharpening.

It will be apparent that the shoe and plate may be of any desired form, provided the shoe extends so nearly to the edges of the thin plate as to properly support the same.

The standards B may be prolonged above the securing-bolt $i$ to form colters $q$, which may be used by simply reversing the standards, each of which is provided with additional openings, $k$, for the securing-bolts, when adjusted to its new position.

I claim—

1. The reversible standards B, carrying plows on one end, and curved at the other to form colters, as set forth.

2. The combination, with the standard, consisting of a plain bar adjustable on the bars $a\ a'\ a'$, of the securing-bolt and nut and gage $n$, adapted to be secured by the nut, as specified.

3. The combination, with the standard, of the bull-tongue $d$ and the broader-pointed end blade, $h$, constructed and adapted to be secured by the same bolt, $m$, passing through both, and to be used together, or either separately, on the same standard, as specified.

4. The combination, in a cultivator-shovel, of the shoe $g$ and the thin steel facing-plate $t$, adjustable on the shoe, conforming thereto, and projecting slightly beyond the edges of the same, substantially as set forth.

5. The combination of the shoe and adjustable thin steel facing-plate $t$, provided with ears $w$, adapted to clamp the edges of the shoe, as specified.

In testimony whereof I have signed my name to this specification in the presence of two subscribing witnesses.

WILLIAM J. DAVIDSON.

Witnesses:
 FRANK M. GREEN,
 COURTNEY A. COOPER.